April 2, 1935.    R. D. SHAW    1,996,438
PROFILING TRACER
Filed March 28, 1934    2 Sheets-Sheet 1

INVENTOR
R. D. Shaw
BY Joseph N. Schofield
ATTORNEY

April 2, 1935.  R. D. SHAW  1,996,438
PROFILING TRACER
Filed March 23, 1934  2 Sheets-Sheet 2

INVENTOR
R. D. Shaw
BY Joseph K. Schofield
ATTORNEY

Patented Apr. 2, 1935

1,996,438

UNITED STATES PATENT OFFICE 1,996,438

PROFILING TRACER

Robert D. Shaw, Hartford, Conn., assignor to Pratt & Whitney Company, Hartford, Conn., a corporation of New Jersey Application March 28, 1934, Serial No. 717,760

9 Claims. (Cl. 90—62)

This invention relates to tracers for electrically controlled machine tools such as automatic die sinking machines shown and described in patent to J. C. Shaw 1,683,581 but more particularly the invention relates to an improvement in the tracer used in such machines when effecting contouring or profiling operations.

An object of the present invention is to provide an improved form of template following tracer wherein the periphery of a generally circular template may be completely traversed automatically by the tracer and a work piece correspondingly profiled by a cutting tool, the relative movements of the cutter and work piece being controlled by contact between said tracer and template.

More particularly it is an object of the invention to provide means for constantly urging a contouring tracer as shown and described in patent to Shaw et al. 1,840,853 to contact with and constantly follow the periphery of a template.

A feature which enables me to accomplish the above named objects is that means are constantly acting upon the tracer to urge it directly toward the template and as the machine is operated these means acting to successively advance the tracer and cutter respectively about the template and work piece so that the tracer is simultaneously urged forwardly along the periphery of the template and is constantly forced toward and into contact with the template.

Another feature which is advantageous is that the template engaging end of the tracer is provided with a fixed sleeve or housing in which is rotatably mounted an annular plate or ring, there being a radially disposed slot in this ring engaged by a pin centrally located with respect to the template. Another feature is that springs are employed disposed between the rotatable plate or ring and the template engaging end of the tracer, one spring constantly urging the tracer toward the template and the other spring constantly forcing the tracer forwardly in its direction of movement about the periphery of the template.

With the above and other objects in view, my invention includes the features of construction and operation set forth in the following specification and illustrated in the accompanying drawings.

In the accompanying drawings annexed hereto and forming a part of this specification, I have shown my invention incorporated as an attachment to the contouring tracer shown and described in the above mentioned Patent 1,840,853 but it will be understood that the invention can be otherwise embodied and that the drawings are not to be construed as defining or limiting the scope of the invention, the claims appended to this specification being relied upon for that purpose.

In the above mentioned drawings I have shown but one embodiment of the invention which is now deemed preferable, but it is to be understood that changes and modifications may be made within the scope of the appended claims without departing from the spirit of the invention.

Briefly and in its preferred aspect my invention may include the following principal parts: first, a tracer lever and support similar in every way to those shown in the above mentioned Patent 1,840,853, the tracer lever being mounted for universal oscillatory movement about an intermediate point and in various operative positions opening and closing spaced contacts at the rear end thereof; second, a fixed casing or sleeve enclosing the tracer lever adjacent its template engaging end; third, a rotatable plate or ring supported for free rotation about an axis substantially concentric with the tracer lever; and fourth, springs attached to the lever and ring and disposed at an angle to each other.

As the contacts opened and closed by this tracer lever are in every way similar to those opened and closed in the above cited patent and control operation of the machine in the same manner, it is not thought that further description of these parts is necessary. It will be noted, however, that there is no spring attached to the rear end of the tracer, nor is there a manually rotatable ring which members in the patented construction force the tracer toward an oscillated position.

Figure 1:
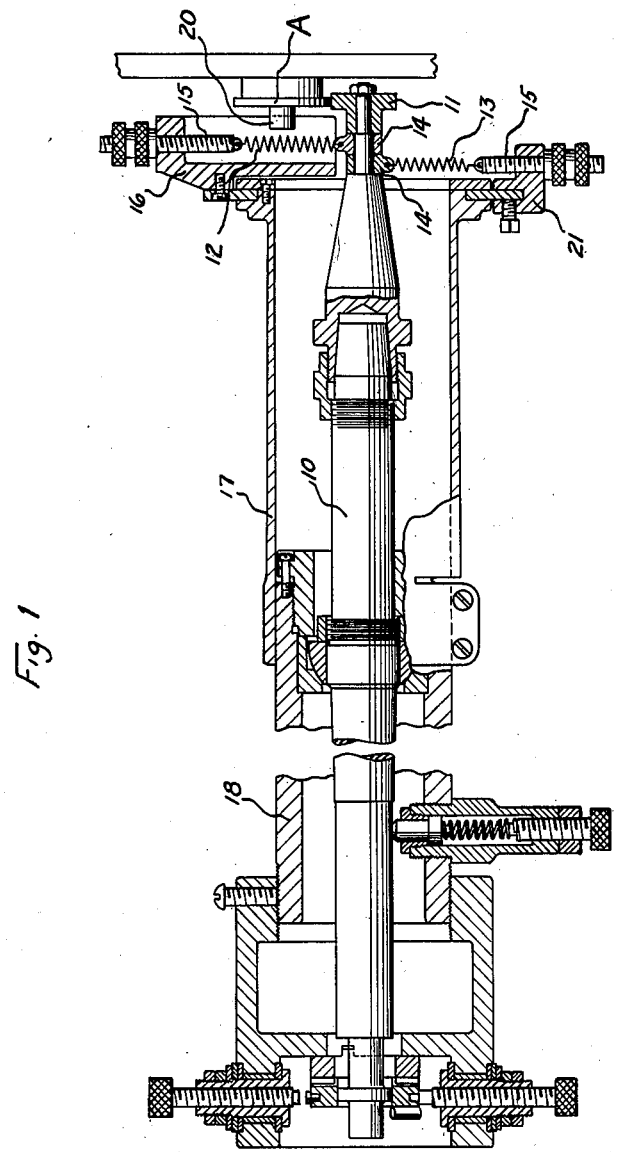
Figure 1 is a central sectional view taken longitudinally through the entire tracer lever and cooperating parts and showing the present improvements applied thereto, the springs being indicated in diametrically opposite positions to more clearly indicate their construction.

At the front or template engaging end of the tracer lever 10 is mounted contact button 11, the diameter of which is chosen with respect to the diameter of the particular milling cutter employed in cutting the work piece (not shown). This button or contact point 11 is, as shown, mounted at the extreme forward end of the tracer 10, there being interposed between this contacting button and the contact lever two spirally wound springs 12 and 13, each of which is attached to a ring 14 loosely surrounding a portion of the tracer lever 10. The outer ends of these springs 12 and 13 are individually attached to radially extending screws 15 adjustably threaded within a ring 16. This ring 16, as shown clearly in Fig. 1, is supported for free rotation upon the outer end of a sleeve 17 fixed upon the support 18 for the tracer lever and concentric thereto. From the above description it will be seen that the plate or ring 16 is free to rotate to any rotative position about the end of the sleeve 17 while maintained concentric to the central position of the lever 10 and in accordance with the positions of the springs 12 and 13 the tracer lever 10 may be urged in any direction.

Figure 2:
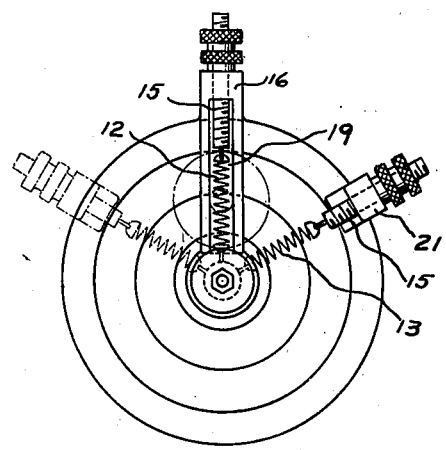
Fig. 2 is a front or face view of the tracer showing the rotatable plate or ring member mounted with respect to a template being followed by the tracer.
Figure 3:
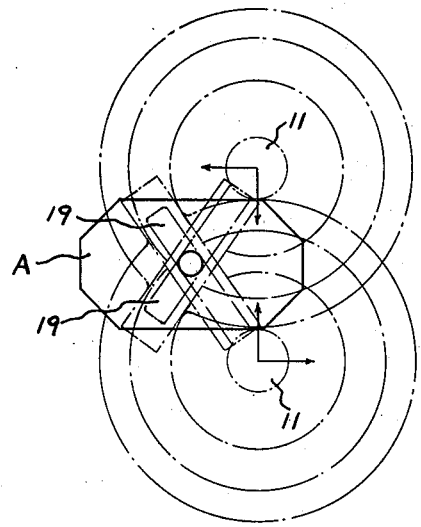
Fig. 3 is a diagrammatic view of a template, the periphery of which is being traced by the present form of tracer, the positions of the tracer and the rotatable ring being indicated in two different positions during operation.

Radially disposed within the plate or ring 16 is a groove 19 which is disposed parallelly with the direction of one of the springs 12 or 13 between the plate 16 and tracer 10. This groove 19 in operation is engaged by a stud or button 20 outstanding from the template A being traced by the tracer lever 10. This stud 20, as shown, is preferably mounted substantially centrally of the template A. The second or supplemental spring 13 is adjustably positioned at an acute angle relative to the first spring 12 which is parallel to the groove 19. The outer end of this spring 13 has its adjusting screw 15 mounted in a small block 21 which may be positioned and clamped to the ring or plate 16 at any desired angle to the first spring 12. Preferably and as shown in Fig. 2, the supplemental spring 13 is disposed at an angle of about 50° or 60° from the first or main spring 12. This spring 13 also may be on either side of the main spring 12 depending upon the direction of movement of the tracer 10 about the template A.

In operation the machine is started with the tracer 10 engaging any point in the periphery of the template A and with the cutter engaging a corresponding point of the work piece (not shown). As the operation of cutting continues and while the tracer 10 is traversing portions of the periphery of the template A the plate or ring 16 is forced to rotate about the sleeve 17 and tracer lever 10 due to the contact between the stud 20 or button on the template A and the radial slot 19 in the ring 16. At all times, therefore, the main spring 12 is positioned angularly in a plane parallel to the plane of the template so as to force the contact button 11 directly against the periphery of the template A. Furthermore, the supplemental spring 13 disposed at an angle to the main spring 12 is constantly urging the tracer in a direction about the template.

In the above mentioned Patent 1,848,503 the tracer follows the contour of the template in the same manner as described above for a quadrant or fraction only of its complete periphery. At successive positions of the tracer on the periphery of the template the angular position of the radially acting resilient member or spring must be adjusted. This is done in the above cited patent by periodically manually adjusting the ring to which the outer end of the spring at the back of the tracer is attached. The tracer is thus at all times resiliently forced towards the periphery of the template. For this purpose the plate to which the spring is attached is successively moved to four or more positions at approximately 90° apart. In the present construction, however, the connection between the plate or ring 16 and the template A due to the stud 20 on the template and radial slot 19 in the ring 16 constantly forces the ring 16 to assume successive rotative positions and therefore the radial main spring or resiliently acting member 12 constantly acts in a direction so that it urges the tracer 10 toward the periphery of the template A in all positions during the following of the complete template. Simultaneously the supplemental spring 13 acts to force the tracer 10 forwardly along the periphery of the template A.

It will be understood that the present construction is not adapted for all possible forms of templates. Templates having reentrant steep angles would not be automatically traversed in their entirety throughout their peripheries. A wide variety of templates, however, generally circular in form may be entirely automatically operated on by the present means.

What I claim is:

1. A template following tracer for profiling machines comprising in combination, a universally oscillatory tracer lever, oscillation of which controls relative movement between a cutter and work, a member surrounding the template end of the tracer lever and rotatable about a fixed axis, said member having a radially disposed slot, a projection disposed centrally of the template being traced and engaging within said slot, and resilient means disposed between the tracer lever and rotatable member normally holding said tracer against said template.

2. A template following tracer for profiling machines comprising in combination, a universally oscillatory tracer lever, oscillation of which controls relative movement between a cutter and work, a member adjacent the template end of the tracer lever and rotatable about a fixed axis, interconnecting means between said rotatable member and template to vary the rotative position of the member during operation, and resilient means disposed between the rotatable member and tracer normally holding said tracer against said template in all positions.

3. A template following tracer for profiling machines comprising in combination, a universally oscillatory tracer lever, oscillation of which controls relative movement between a cutter and work, a member adjacent the template and rotatable about a fixed axis, interconnecting means between said member and tracer lever to rotate said member as the tracer traverses the template, and resilient means normally holding said tracer against said template in all positions of the tracer relative to the template, said resilient means being attached to and rotatable with said rotatable member.

4. A template following tracer for profiling machines comprising in combination, a universally oscillatory tracer lever, oscillation of which controls relative movement between a cutter and work, a member adjacent the template end of the tracer lever and rotatable about a fixed axis concentric about the axis of the tracer lever, said member having a radially disposed slot therein, a projection disposed centrally of the template and engaging said slot, and resilient means between said rotatable member and tracer lever normally holding said tracer against said template.

5. A template following tracer for profiling machines comprising in combination, a universally oscillatory tracer lever, oscillation of which controls relative movement between a cutter and work, a member adjacent the template end of the tracer lever and rotatable about a fixed axis, said member having a radially disposed slot, a projection disposed centrally of the template and engaging within said slot, and two angularly spaced resilient means disposed between the tracer lever and member normally holding said tracer against said template in all positions during operation.

6. A template following tracer for profiling machines comprising in combination, a universally oscillatory tracer lever, oscillation of which controls relative movement between a cutter and work, a member adjacent the template end of the tracer lever and rotatable about a fixed axis, said member having a radially disposed slot, a projection disposed centrally of the template and engaging within said slot, a spring attached at one end to said rotatable member and extending parallelly to the slot therein, the other end engaging the tracer lever whereby said tracer lever is held in contact with the template, and a supplemental spring disposed between the tracer lever and said rotatable member at an angle to said first spring.

7. A template following tracer for profiling machines comprising in combination, a universally oscillatory tracer lever, oscillation of which controls relative movement between a cutter and work, a member adjacent the template end of said lever and rotatable about a fixed axis concentric to said tracer lever, springs attached at one end to spaced positions on said rotatable member and at their other ends engaging the tracer lever whereby said tracer lever is held in contact with the template, and means to rotate said member as the tracer traverses the periphery of the template.

8. A template following tracer for profiling machines comprising in combination, a universally oscillatory tracer lever, oscillation of which controls relative movement between a cutter and work, a member mounted on said lever and rotatable about a fixed axis substantially concentric with said lever, interconnecting means between said member and lever to rotate said member during operation as the tracer traverses the template, and resilient means normally holding said tracer against said template in all positions of the tracer relative to the template, said resilient means being attached to and rotatable with said rotatable member.

9. A template following tracer for profiling machines comprising in combination, a universally oscillatory tracer lever, oscillation of which controls relative movement between a cutter and work, a member mounted on said lever and rotatable about a fixed axis, springs attached at one of their ends to spaced positions on said rotatable member and at their other ends engaging the tracer lever whereby said tracer lever is held in contact with the template during operation, and means to rotate said member as the tracer arm traverses the periphery of the template.

ROBERT D. SHAW.